United States Patent [19]

Klocke et al.

[11] Patent Number: 5,214,469
[45] Date of Patent: May 25, 1993

[54] METHOD OF AND ARRANGEMENT FOR REENLARGEMENT OF MICROFILMED ORIGINALS

[75] Inventors: Helmut Klocke, Poecking; Traugott Liermann, Unterhaching, both of Fed. Rep. of Germany

[73] Assignee: Agfa-Gevaert AG, Leverkusen, Fed. Rep. of Germany

[21] Appl. No.: 872,639

[22] Filed: Apr. 22, 1992

[30] Foreign Application Priority Data

May 23, 1991 [DE] Fed. Rep. of Germany ....... 4116801

[51] Int. Cl.$^5$ ............................................. G03B 13/28
[52] U.S. Cl. ........................................ 355/45; 355/46; 355/64
[58] Field of Search .................. 355/45, 46, 64, 44

[56] References Cited

U.S. PATENT DOCUMENTS 4,648,707  3/1987  Tanasescu ............................ 355/45
4,754,306  6/1988  Auer et al. ............................ 355/45

FOREIGN PATENT DOCUMENTS 3622088  7/1986  Fed. Rep. of Germany .

*Primary Examiner*—Richard A. Wintercorn
*Attorney, Agent, or Firm*—Michael J. Striker

[57] ABSTRACT

A method of reenlargement of microfilm originals stored in form of microimages includes providing a plurality of microimages on a carrier, selecting microimages from the plurality of microimages for reenlargement on a receiving medium, positioning a selected microimage in an image window suitable for the reenlargement, transferring the microimage on the receiving medium by an objective focused on the image window, during the transfer of the microimage on the carrier positioning a second microimage located on another carrier in a second image window and after the transfer of the first mentioned microimage, transferring the second microimage on the receiving medium.

10 Claims, 3 Drawing Sheets

METHOD OF AND ARRANGEMENT FOR REENLARGEMENT OF MICROFILMED ORIGINALS

BACKGROUND OF THE INVENTION

The present invention relates to a method of and an arrangement for reenlargement of microfilmed originals.

In particular, it relates to such a method and arrangement in which a plurality of microimages is contained on a carrier, a selection of the plurality of microimages for a reenlargement is performed on a receiving medium, each of the preselected microimages is positioned in an image window which is suitable for the reenlargement, and a transfer of the microimage on the receiving medium is performed by an objective focused on the image window.

Arrangements and methods of the above mentioned general type are known in the art. They are disclosed for example in the German document DE-PS 3,622,008. In the device disclosed there due to a corresponding preselection a number of microimages is automatically reenlarged. All images preselected for reenlargement must be however located on the same carrier. When all preselected microimages are enlarged, it is necessary to exchange the carrier, to insert another carrier in the device, and to position the next microimage provided for the reenlargement. During the time of removal of the original carrier, new insertion of the new carrier and movement of the next microimage no reenlargement can be performed and therefore there is a time loss. This is especially disadvantageous when the microimages, for example in a microfilm archive, are arranged on many carrier and the probability of enlargement of several microimages of one carrier one after the other is very low.

SUMMARY OF THE INVENTION

Accordingly, it is an object of the present invention to provide a method of and an arrangement for reenlargement of the above mentioned type, in which the reenlargement process is performed during the change of the carriers and positioning of the next microimages in a not interrupted manner.

In keeping with these objects and with others which will become apparent hereinafter, one feature of the present invention resides, briefly stated, in a method of the above mentioned type in which during the transfer of the first microimage located on the first carrier, a second microimage located on another carrier is positioned in a second image window and after the transfer of the first microimage the second microimage is transferred unto the receiving medium.

When the process is performed and the arrangement is designed in accordance with the present invention, it avoids the disadvantages of the prior art and achieves the above mentioned objects.

The invention proceeds from the recognition that during the reenlargement of the first microimage, another microimage located on another carrier is positioned so that after ending of the reenlargement of the first microimage, the reenlargement of the second microimage contained on the second carrier can start almost immediately or at least with waiting time.

In accordance with the present invention in order to switch between the individual image windows, the focus of the objective used for the reenlargement can change from one first image window in which the first microimage to be reenlarged is located to a second image window in which the next microimage for the enlargement is located. This can be performed, for example, by moving the whole objective or, in the case of stationary objective, by adjusting the focus from a first image plane in which the first image window is located, to a second image plane in which the second image window is located. The path of rays of the objective extends then through the first image window and the microimage located in it. Due to the low depth of focus of the used objective, no disturbances are caused.

The latter mentioned features in accordance with the present invention are especially suitable for use with plain microimage carriers, or so-called microfishes.

It is of course also possible after ending the reenlargement of the first microimage, not to change the focus of the objective. Instead, the first image window can be moved from the focus of the objective and the second image window with the microimage positioned in it can be brought into the focus of the objective.

In many cases it is advantageous when after the end of the first reenlargement, only relatively simple and little time consuming processes are required until the second microimage can be reenlarged.

It is especially advantageous during the reenlargement of microimages located on so-called microfilms to perform a relatively lengthy threading-in and rewinding processes parallel with the reenlargement of another microimage.

In accordance with a further advantageous embodiment of the present invention for the application when the microimages provided for reenlargement are contained on more than two carriers, an exchange device is provided for the carriers and a container which receives several carriers. The exchange device automatically removes the respective required carriers from the containers, depending on the preselection, then transports the carriers in a free positioning device, and brings the carriers again from the positioning device back into the container. When a microimage is reenlarged the exchange of the carrier from the container and positioning of the next microimage can be performed.

While the adjustment of the focus and the exchange of the carriers from the container is performed automatically in the positioning device, it is desirable to so design the method for a reenlargement of microfilmed originals, that an adjustment of the focus and an exchange of the carriers between the positioning device on the container is performed less often. For this purpose, in accordance with a further embodiment of the invention, the sequence of the microimages determined for the reenlargement deviates from the sequence in which the preselection is performed. First all microimages which are contained on both carriers inserted in the device are reenlarged. Then additionally, it is determined that two selected microimages lie very close on one carrier, these microimages are immediately reenlarged one after the other. The pause for positioning produced therebetween is shorter than the time required for the readjustment of the focus.

Subsequently, one or two new carriers are transported in the apparatus by the exchange device and the microimages contained in them are reenlarged in the above described manner.

In the practice it often happens that the sequence of the associated microimages, approximately the individual size of one document, are located one after the other on the carrier. In such a case, the individual microimages of the sequence are positioned in the first image window one after the other in time and reenlarged. The focus then changes not between the image windows, but instead remains in the image window in which the sequence is located.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
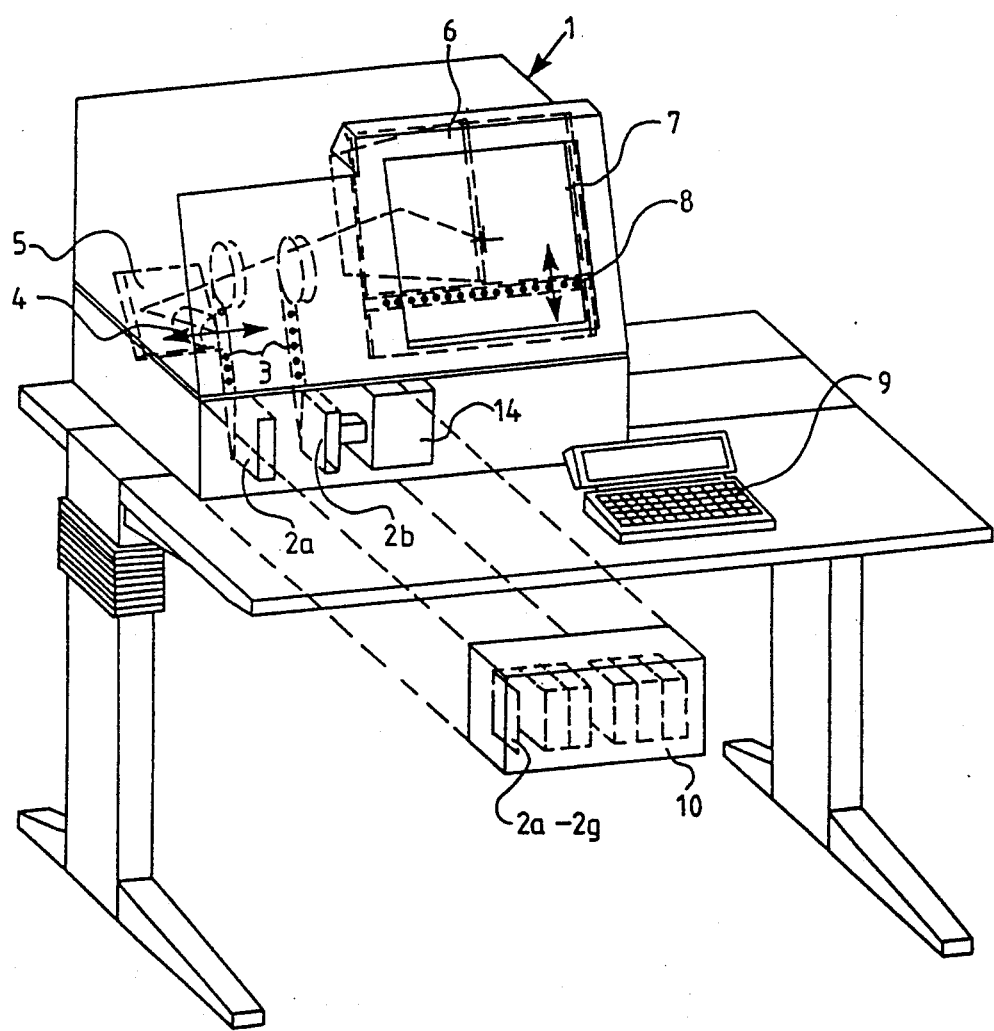
FIG. 1 is a view of an arrangement for reenlargement in accordance with the present invention in which individual elements of the arrangement are shown partially schematically.

A device for reenlarging of microfilmed originals is identified in FIG. 1 with reference numeral 1. Two microfilm rolls 2a and 2b are provided in the device. The microfilm rolls serve as carriers for microimages identified with reference numeral 3. The microimages are enlarged through an objective 4 and transferred by mirrors 5 and 6 onto an image wall 7. Also, the objective 4 transfers the reenlarged microimage onto a receiving medium 8 which in the shown example is a scanner. The scanner scans the reenlarged microimage by lines and performs an electronic further processing of the image.

Two microfilm rolls 2a and 2b are inserted in the device. A container 10 is located in front of the device 1 and for better understanding is shown in an explosion view. Further microfilm carriers 2c-2g are located in the container 10. An exchange device is identified with reference numeral 14. It removes microfilm carriers from the container 10 and inserts them into the device 1 and then transports them back from the device 1 to the container 10.

The arrangement further has an input device 9 which performs the selection of microimages 3 located on the microfilm carriers 2a-2g for their reenlargement. It is also possible to perform the preselection of the microimages provided for the reenlargement by a data carrier or a data remote transmission.

Figure 2:
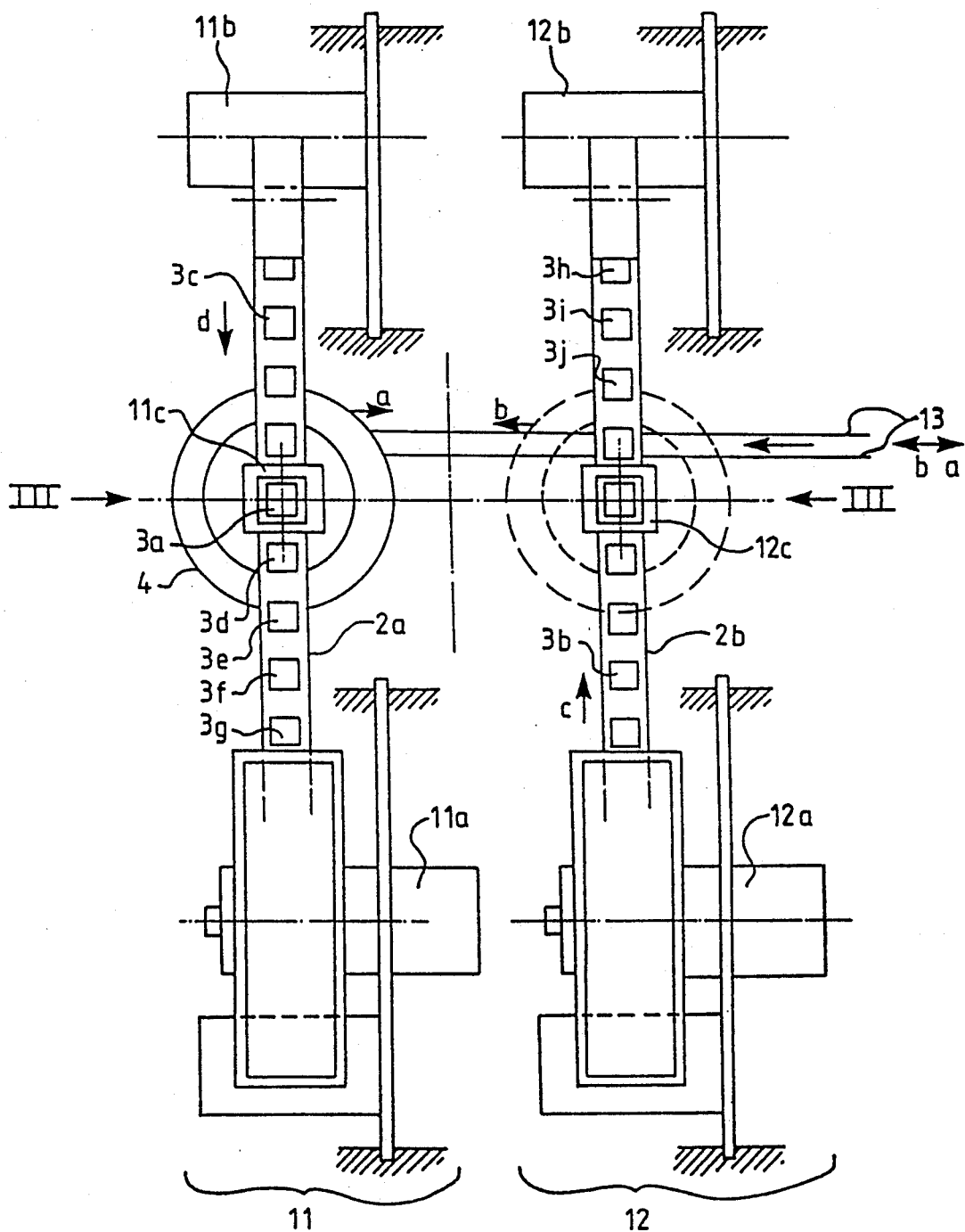
FIG. 2 is a view schematically showing devices for positioning microimages and a device for changing the focus.

FIG. 2 illustrates the positioning of the individual microimages 3 located on the microfilms 2a-2g and the adjustment of the focus of the adjustment 4. Two independent positioning devices are identified with reference numerals 11 and 12. Each of the positioning devices 11 and 12 include an unwinding motor 11a or 12a and a winding motor 12a or 12b. The microfilm rolls 2a and 2b can be moved by the unwinding and winding motors independently from one another so that one of the microimages 3 is positioned in the respective image window 11c or 12c. In order to provide better distinguishing in the subsequent description the microfilm images 3 are identified with indexes 3a–3g. The objective 4 is identified by two concentric circles. In the shown case the objective 4 is focused on the image window 11c. The second possible position of the objective 4 in which it is focused on the image window 12c is schematically shown by interrupted, concentrically arranged circles. The objective 4 is either arranged displaceably in correspondence with the arrows A and B between both image windows 11c and 12c.

During the reenlargement of the microimage 3a located in the image window 11c, the positioning device transports by means of the unwinding motor 12a or the winding motor 11a the microfilm 2b in direction of the arrow C until the microimage 3b is located in the image window 12c. After ending the reenlargement of the microimage 3a the mechanical system 13 moves the objective 4 in direction of the arrow A and therefore adjusts the focus of the objective 4 to the image window 12c. Now the reenlargement of the microimage 3b can start. During this the microfilm roll 2a is moved by the positioning device 11 in the direction of the arrow D until the microimage 3c is located in the image window 11c. After ending the reenlargement of the microimage 3b, the mechanical system 13 moves the objective 4 in the direction of the arrow B back to is original position and the reenlargement of the microimage 3c begins.

The above described process is repeated until all the microimages 3 selected for the reenlargement and located on the microfilms 2a and 2b are reenlarged.

When two microimages provided for reenlargement are located close to one another on the carrier, then in dependence on the rewinding speed it can be time consuming to position the next microimage in the same image window and simultaneously reenlarge, instead of first to adjust the focus of the objective to another image window and then enlarge the microimage located in it.

In the cases when the individual microimages 3 provided for reenlargement are arranged in form of a sequence of the microimages 3d, 3e, 3f, 3g, the microimages 3d–3g can be reenlarged one after the other, and the focus of the objective 4 can remain fixedly adjusted to the image window 11c. After the last microimage 3g of the sequence is reenlarged, the mechanical system 13 moves the objective 4 further to the image window 12c and the reenlargement of the sequence of the microimages 3h, 3i, 3j begins.

Figure 3:
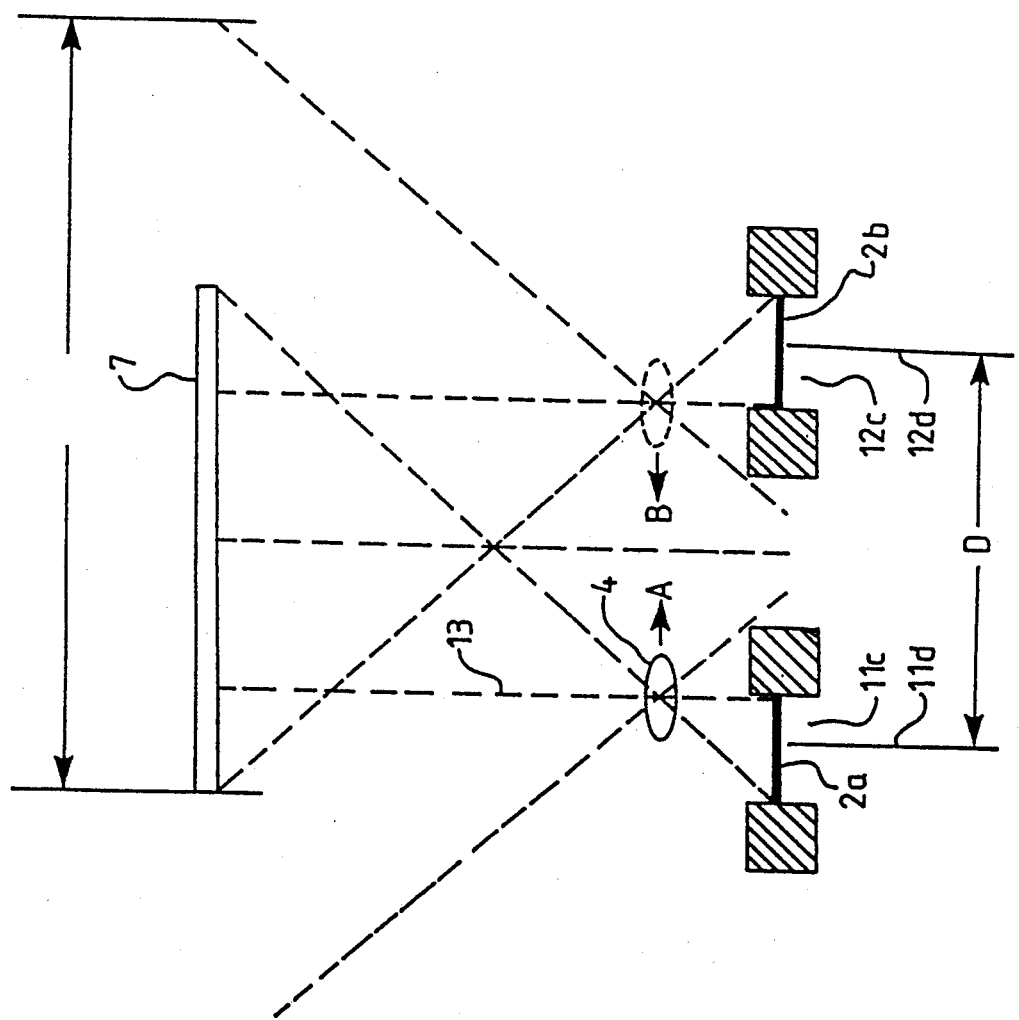
FIG. 3 is a view showing the arrangement of FIG. 2 in a section taken along the line III with a schematic path of rays.

FIG. 3 shows the view taken along the section line III in FIG. 2. For better showing the scale representation is not provided. The microfilm 2a or 2b is arrange in the image windows 11c or 12c. The objective 4, here formed by a lens, has an image circle which is greater than the microimage 3. The objective 4 is arranged so that the microimage is located eccentrically relative to the optical axis 13. When the focus of the objective 4 is adjusted to the image window 11c, the image window is located mainly left of the optical axis 13. During the adjustment to the image window 12c, the image window 12c is located mainly right of the optical axis 13. This has the advantage that during the adjustment of the focus of the adjustment 4 it must be moved over a smaller distance than the distance D between the center points 11d and 12d of the image windows 11c and 12c. Due to this arrangement the image circle diameter which is theoretically available is not used. During the dimensioning of the objective 4 and the image wall 7 this must be taken into consideration and the microimage 3 is projected with full format on the image wall 7.

It will be understood that each of the elements described above, or two or more together, may also find a useful application in other types of constructions and methods differing from the types described above.

While the invention has been illustrated and described as embodied in a method of and an arrangement for the reenlargement of microfilmed originals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of reenlargement of microfilm originals stored in form of microimages, comprising the steps of providing a plurality of microimages on a carrier; selecting microimages from said plurality of microimages for reenlargement on a receiving medium; positioning a selected microimage in an image window suitable for the reenlargement; transferring the microimage on the receiving medium by an objective focused on the image window; during the transfer of the microimage on the carrier positioning a second microimage located on another carrier in a second image window; and after the transfer of the first mentioned microimage, transferring the second microimage on the receiving medium.

2. The method as defined in claim 1, wherein after the transfer the first mentioned microimage a focus of the objective is adjusted from the first mentioned image window to second image window.

3. The method as defined in claim 1, wherein after transfer of the first mentioned microimage, the second image window which contains the second microimage is brought the focus of the objective.

4. The method as defined in claim 1, wherein a second objective is provided, said transferring including transferring the microimage located in said first image window through one of said objectives and transferring the microimage located in the second image window through another of said objectives.

5. The method as defined in claim 1, wherein the first mentioned carrier has a sequence of the microimages while the second carrier also has the sequence of microimages, said transferring being performed so that during the transferring of the sequence provided on the first mentioned carrier positioning of the sequence contained in the second carrier in the second image window begins, and after transferring of a last microimage of the sequence located on the first mentioned carrier the sequence located on the second carrier is transferred to the receiving medium.

6. The method as defined in claim 1, wherein more than two such carriers are provided and carry a predetermined number of microimages; and further comprising automatic exchange of the carriers and subsequent positioning of a next micro image determined for the reenlargement in a respective one of the image windows.

7. The method as defined in claim 1; and further comprising performing the reenlargement of microimages on the receiving medium in deviation from a sequence determined by the selection, and computing a new sequence in which a number or a time for adjustment of the focus and/or the exchange of the carriers is minimized.

8. An arrangement for reenlargement of microfilmed originals stored in form of microimages, comprising means for selecting a microimage for a plurality of microimages contained in a carrier for transferring the microimage to a receiving medium; a first image window in which the selected microimage can be positioned for the reenlargement; an objective focusable on said first image window for transferring the microimage to the receiving medium; a second image window arranged so that during the transferring of the microimage located on the first carrier a second microimage located on a second carrier can be positioned in said second image window, and after the transferring of first microimage the second microimage can be transferred to the receiving medium.

9. An arrangement as defined in claim 8; and further comprising two independent positioning devices arranged to place microimages contained in the carriers in a respective one of said image windows; and means for adjusting a focus of said objective between said first image window and said second image window.

10. An arrangement as defined in claim 8; and further comprising an exchange device and a container receiving said carriers, said exchange device being operative to transport said carriers between said container and said positioning devices..

* * * * *